United States Patent [19]

Hargraves

[11] 4,044,406
[45] Aug. 30, 1977

[54] COMPACT PORTABLE SELF-CONTAINED AEROBIC DIGESTION TOILET

[76] Inventor: William J. Hargraves, 121 Lake Highlander Mobile Home Park, County Road No. 1, Dunedin, Fla. 33528

[21] Appl. No.: 591,069

[22] Filed: July 1, 1975

[51] Int. Cl.² ............................................. E03D 5/016
[52] U.S. Cl. ............................................. 4/10; 4/78; 210/152; 210/220
[58] Field of Search ..................... 4/10, 76, 78, 79, 80, 4/111, 115, DIG. 12; 210/152, 220; 203/DIG. 1, DIG. 5

[56] References Cited

U.S. PATENT DOCUMENTS

| 2,445,350 | 7/1948 | Ginnings ....................... 203/DIG. 1 |
| 3,624,665 | 11/1971 | Klingle, Sr. ............................ 4/10 X |
| 3,720,962 | 3/1973 | Harrah ............................. 4/DIG. 12 |
| 3,756,784 | 9/1973 | Pittwood ......................... 4/DIG. 12 |
| 3,776,383 | 12/1973 | Hargraves ....................... 4/DIG. 12 |
| 3,817,858 | 6/1974 | Yost ................................. 4/DIG. 12 |
| 3,873,445 | 3/1975 | Bussard ............................... 4/10 X |
| 3,907,679 | 9/1975 | Yost ............................... 203/DIG. 5 |

OTHER PUBLICATIONS

*Mullbank* — Aerobic Toilet Brochure, AB OPE--Tryck, Ostersund-1971.

*Primary Examiner* — Richard E. Aegerter
*Assistant Examiner* — Stuart S. Levy
*Attorney, Agent, or Firm* — Cushman, Darby & Cushman

[57] ABSTRACT

A portable toilet having a series of compartments for aerobic digestion of the waste material is constructed for compactness by disposing the compartments in series around a central primary compartment. The purified waste effluent is used for rinsing the toilet bowl.

3 Claims, 17 Drawing Figures

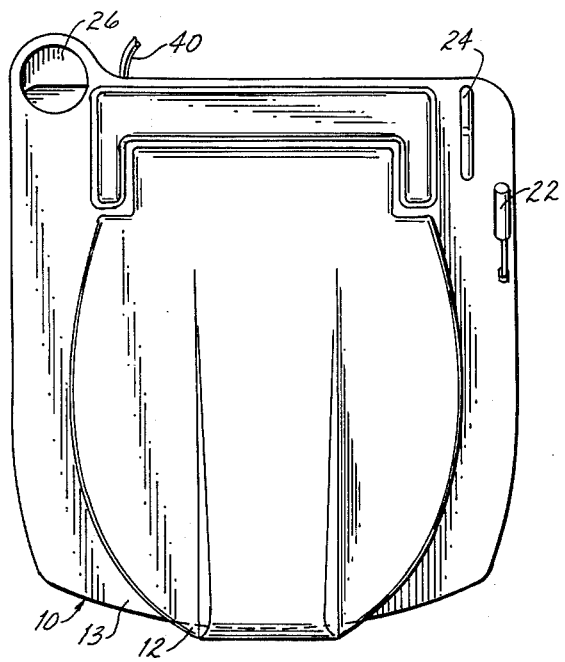
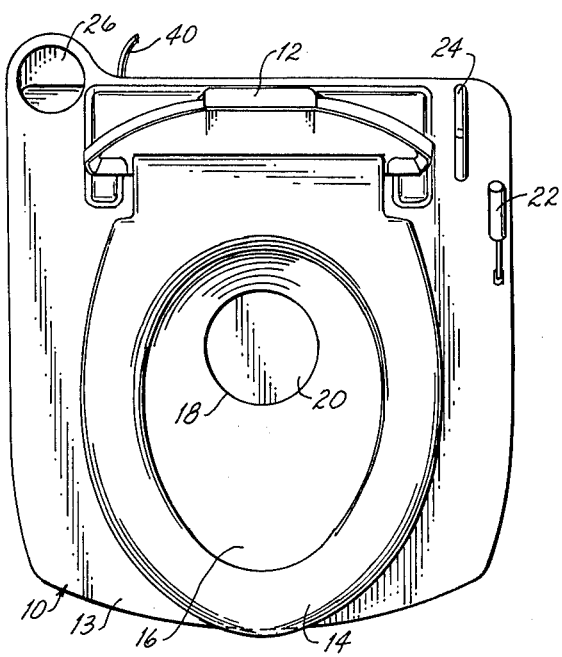
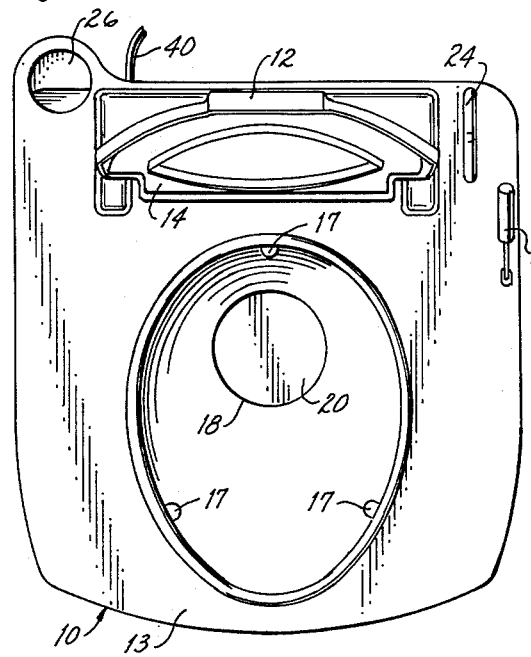
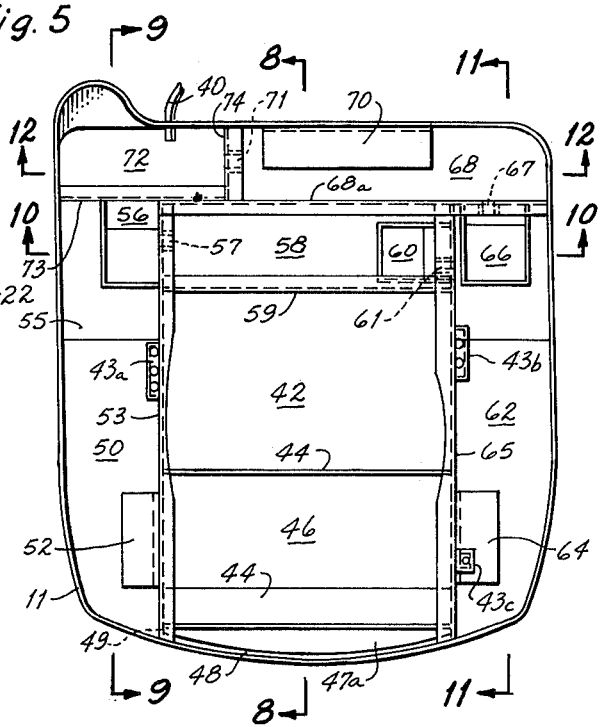

COMPACT PORTABLE SELF-CONTAINED AEROBIC DIGESTION TOILET

This invention relates to an improvement in portable toilets suitable for use on construction jobs, in boats, travel trailers, campers, and any place where a toilet may be needed or desired. The toilet of this invention has built therein means to completely treat and purify the waste material, so there is no pollutant discharged therefrom, and no emptying, clean-out or servicing is needed, except after long-term use. No plumbing, running water or chemicals are required, and no large amount of power is needed, as with a toilet that burns the waste. This toilet uses about the same power as a 75 watt light bulb. Upon exceptional use, an overflow passage will discharge a small amount of relatively pure, harmless liquid. A small amount of the purified liquid is used to rinse the toilet bowl.

It is the primary object of this invention to provide a portable toilet which is compact, which contains sufficient apparatus to treat the waste so that no frequent servicing is necessary, and which treats the waste and disposes of it and leaves no final material to be disposed of.

These and other objects and advantages will appear hereinafter as this disclosure progresses, reference being made to the accompanying drawings in which:

FIG. 2 is a top plan view of the toilet with its lid in the closed position.

FIG. 3 is a top plan view of the toilet with its lid in the raised position, revealing the toilet seat;

FIG. 4 is a top plan view of the toilet with its lid and seat in the raised position, revealing the bowl in its entirety, in the bowl rinsing orifices;

FIG. 5 is a top plan view of the toilet with its entire upper functioning portion removed to reveal the inner compartmentation and sectional cuts of subsequent figures;

Figure 1:
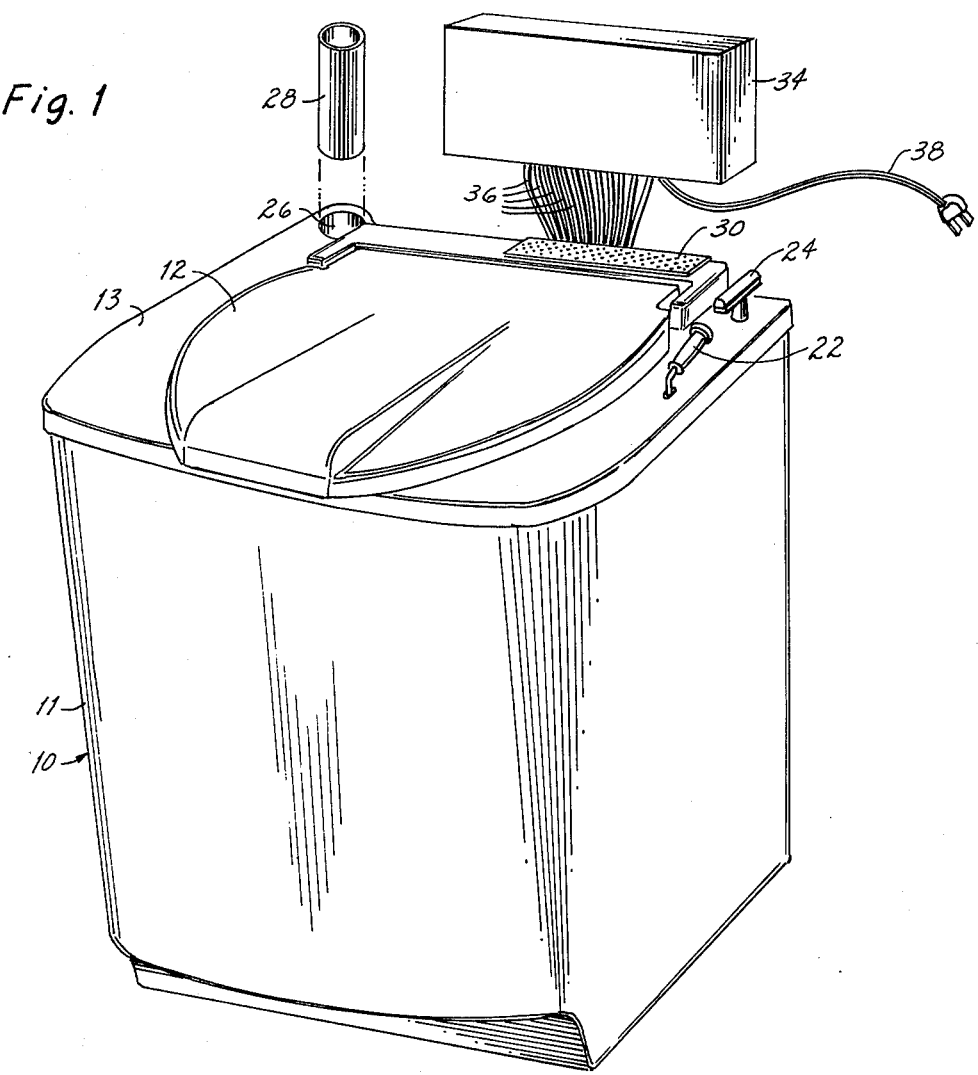
FIG. 1 is a perspective view of a compact portable toilet.

Referring first to FIG. 1, numeral 10 (with arrow) indicates the overall toilet device, comprised of a base structure 11 and a removable upper portion 13 consisting of several functioning parts partly visible in FIG. 1 and more readily seen in FIGS. 2, 3 and 4, such as the hinged seat lid 12, hinged seat 14, bowl aperture 18, bowl rinsing orifices 17, slideable bowl aperture closing door 20 which is externally operated by lever 22, and a manual flushing pumphandle 24. Some other externally visible parts of upper portion are the exhaust venting aperture 26, exhaust vent pipe 28, ventilation intake grill 30, with its pivotal bolt 31, and its latching device 32. Also shown in FIG. 1 is a wall-mounted aeration pump pack 34, aeration tubes 36 and a conventional two-wire electrical lead and plug 38. Not shown is a remote conventional squirrel-cage electrical exhaust fan which may be located in any convenient place integrally with the exhaust vent pipe 28. In fact, the exhaust fan may be of any of several types, including turbine types actuated by ambient external winds. At the rear of the toilet portion, an emergency overflow tube 40 is visible in many of the drawings.

Figure 8:
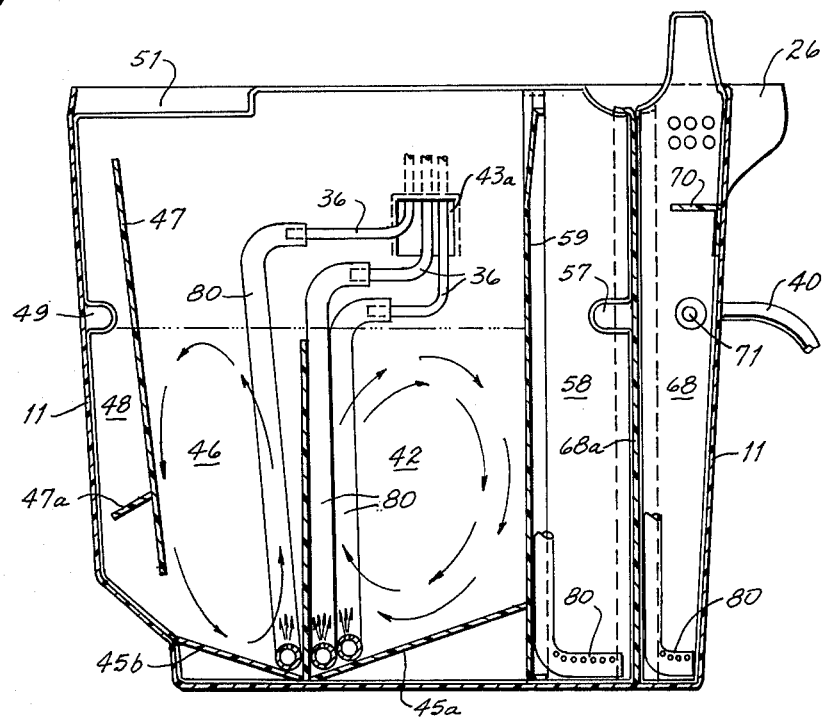
FIG. 8 is a sectional view taken along line 8—8 of FIG. 5.

Referring more specifically now to FIGS. 5, 8, 9, 10, 11 and 12, the configuration of the interior compartmentation of the base structure 11 and the purposes of their configurations become more readily understood as this description progresses through the several stages of interaction. As seen in FIGS. 5 and 8, at the center of the structure 11 is the primary receptor compartment 42, separated from a secondary compartment 46 by a weir 44. Initially approximately 2 gallons of water are introduced into the primary compartment 42, to which is added a half ounce of desiccated bacteria and enzymes which produce five cultures, one each for the consumption of starches, fats, proteins, carbohydrates, and fibers. These cultures thrive and tend to remain where their food is most abundant, which is, of course, this primary chamber 42, although they will progress to some extent, to successive compartments until aerobic digestion and oxydation destroy this "food". These cultures also feed upon coliform and other bacteria and virus, and as they are starved out from chamber to chamber, they cease to multiply and start dying out. Aeration tubing 36, seen in FIG. 8, terminate into plastic diffusers 80, four of which lie at the lowest end of the downwardly slanted floor 45 of the primary chamber 42. For simplicity in the drawings, the liquid itself is not shown, but the aerobic action that takes place within the liquids in the various compartments are shown by arrows emanating from the diffusers 80 and the ultimate rolling motion of the areated liquid is indicated by the longer arrows. In the process of this agitation, the solids are constantly raised upwards and backwards toward wall 59 by the forced aeration. They then fall down, sliding down the slanted floor 45a, only to repeat the motion caused by the aerators. This ultimately breaks the solids down to meld with the liquid and to be further digested by the culture.

Figure 9:
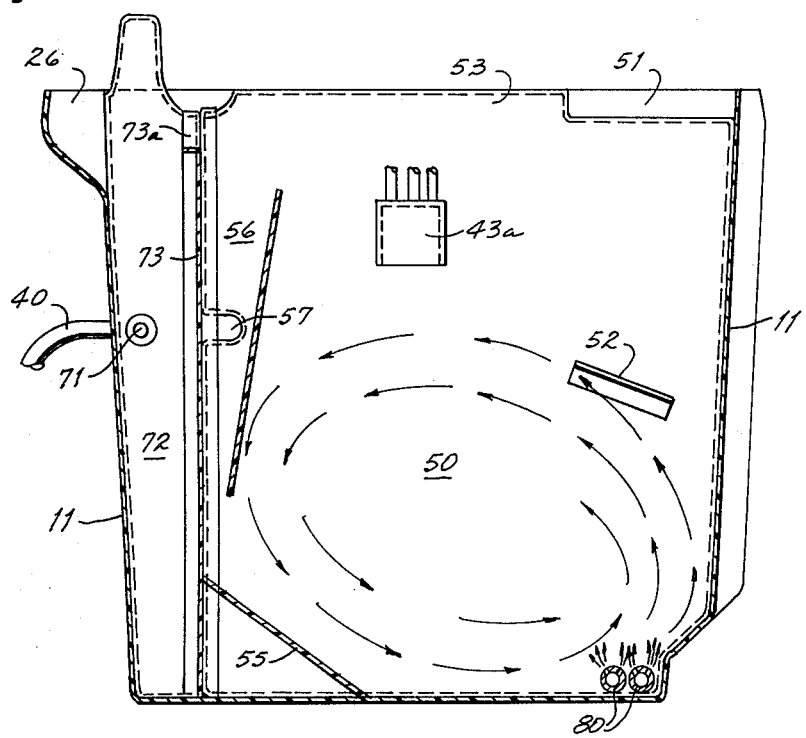
FIG. 9 is a sectional view taken along lines 9—9 of FIG. 5.

Ideally, only liquids flow over the top of weir 44, which is lower than the overflow aperture 49. Practically, however, some solids do pass over weir 44, but the double turbulance at the rear side of weir 44 tends to draw them back into compartment 42. The slanted floor 45b in compartment 46 repeats, to an extent, the action that takes place in compartment 42, but with a flatter upright oval path, as indicated by the arrows; This pattern does not disturb the quiescence of the liquid in compartment 48. A baffle 47 partitions the secondary compartment 46 to provide a quiescent chamber 48. Liquid passes under baffle 47 to enter quiescent chamber 48. Once in a quiet mode, the suspended solids settle down and out into the moving current of compartment 46 again. The ordinary use of a toilet is very intermittant, with plenty of settling time, therefore, the liquid near the surface of chamber 48 is practically free of suspended solids when it moves into compartment 50 through aperture 49. When a pint of liquid moves under baffle 47 into chamber 48, it moves evenly all across the wide bottom, not mixing with the encased liquid but pushing clarified liquid out from the surface through aperture 49. Compartment 50 is a tertiary chamber as shown in FIG. 9. An important feature of the side walls is that as the aeration tubes 36 are introduced into a compartment through a side wall, recesses 43a, 43b and 43c are provided in order not to kink or distort the tubing in any way that might prevent uniform aeration conditions. It should also be noted that baffle 47 has a continuous downwardly slanting horizontal sub-baffle 47a which serves to further prevent mixing in compartment 48.

Figure 10:
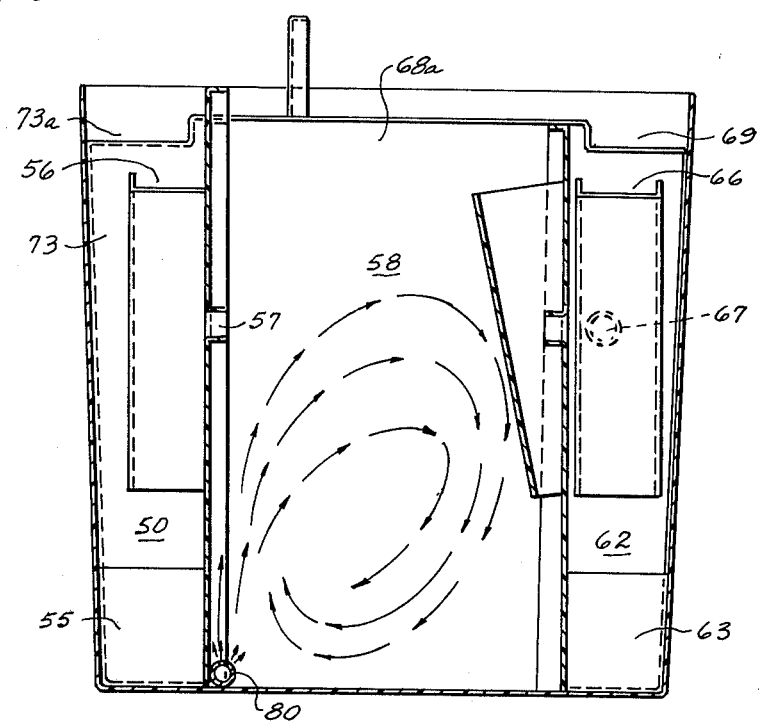
FIG. 10 is a sectional view taken along lines 10—10 of FIG. 5.
Figure 11:
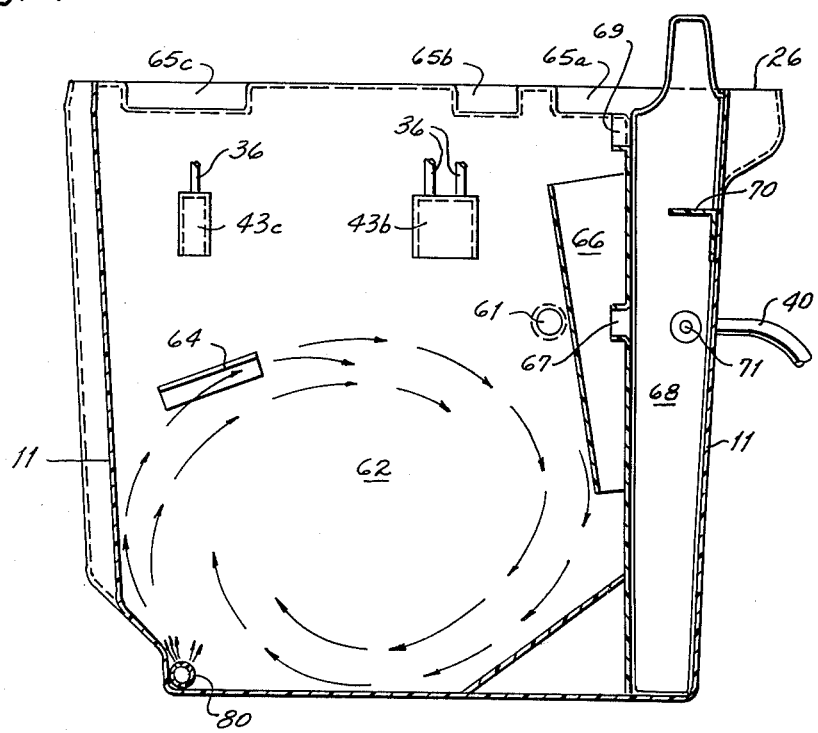
FIG. 11 is a sectional view taken along lines 11—11 of FIG. 5.

Considering FIGS. 5 and 9, the tertiary chamber 50, defined by the outer walls of the base structure 11 and by walls 53 and 73, it can be seen that liquids flowing in through aperture 49 will be agitated and aerated by diffusers 80 in an oval pattern described by the arrows, said oval pattern being influenced by angular baffle 52, the walls of quiescent sub-chamber 56, and slanted rear floor 55. Inasmuch as fewer solids would enter compartment 50, the quiescent compartment 56 is smaller in size than quiescent compartment 48 which is six to 10 times larger than the anticipated normal charge. Compartment 58 is defined by walls 53, 65, 59 and 68a, as seen in FIGS. 5 and 10. Liquid flowing from compartment 50 through aperture 57 into compartment 58 is met with further aeration, the pattern of which is described by arrows, and then it follows a path through another quiescent chamber 60 into overflow aperture 61 to compartment 62, as shown in FIGS. 5 and 11.

Figure 12:
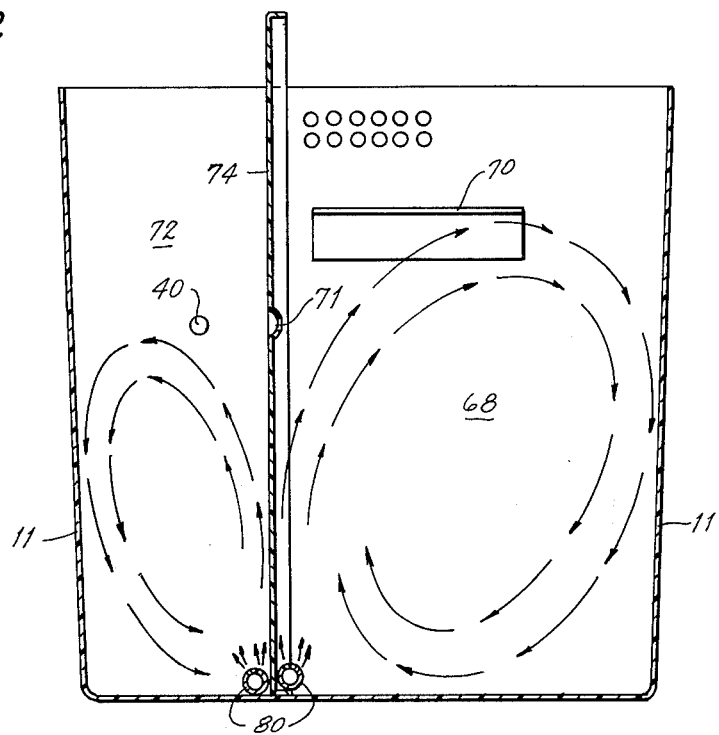
FIG. 12 is a sectional view taken along lines 12—12 of FIG. 5.

Compartment 62 is defined by walls 11, 65 and 68a and is similar in configuration to compartment 50, functioning in like manner before passing liquid into the flushing compartment 68, which is shown in FIGS. 5 and 12. The flushing compartment 68, is defined by walls 11, 68a and 74. It receives virtually pure (but not potable) liquid from compartment 62 via overflow aperture 67 (see FIG. 10). The flushing compartment 68 is aerated by diffuser 80, the pattern of which circulation is again indicated by arrows. Excess overflows through aperture 71 (FIG. 13) into a final emergency polishing chamber 72, defined by walls 11, 73 and 74, where it is again aerated. It would then pass through an emergency aperture and tube 40.

Figure 6:
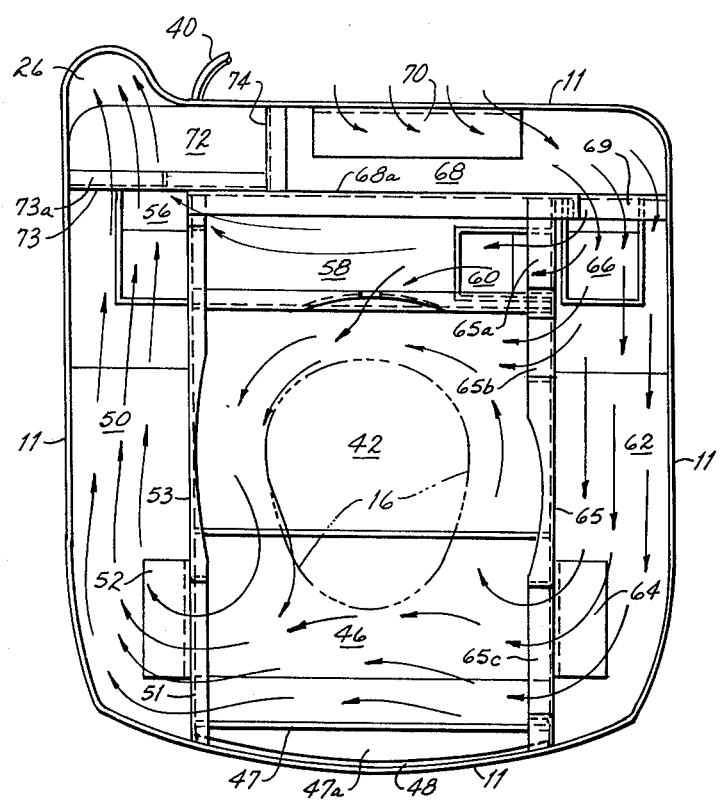
FIG. 6 is a view similar to FIG. 5, revealing inner compartmentation and forced ventilation air flow.

Returning now to FIG. 6, a schematic drawing disclosing the forced air suction flow of the ventilating system. Air enters via intake grill 30 into top of flushing compartment 68, hitting baffle 70, which disperses it across the surface of the liquid; then over a wall opening 69 into compartment 62. From 62 it passes over wall openings 65a, 65b and 65c into the tops of compartments 42, 46 and 58, respectively. Phantom lines 16 indicate that the bowl portion of the toilet occupies space within compartments 42 and 46, and it extends laterally from wall 53 to wall 65, forcing the air to take a swirling path near the liquid and beneath the bowl 16 before passing into the top of compartment 50 via wall opening 51 and thence over wall 73 via wall opening 73a into compartment 72 and on out the exhaust pipe 28. At this point, it should be noted that as aeration takes place within the various compartments, because the aeration air is introduced at the bottom and passes upwardly through the liquid, this air becomes highly saturated with liquid which contains minute particles of ash, dissolved minerals and salts which are caught up and are carried out by the ventilation air. In addition, constantly bursting bubbles send tiny droplets of this same liquid into the air stream to be carried out into the atmosphere. This evaporative and aerobic action, combined with the bacterial and enzymatic action taking place, is what purifies and deodorizes the excretive materials so effectively. The turbulant, oxygen-hungry liquid absorbs oxygen on contact with air, and it therefore absorbs a large quantity of oxygen from the swiftly moving, ever changing, turbulant air stream which constantly scrubs the surface of the liquid, increasing aerobic digestion immensely. All this is accomplished without any moving parts within the toilet, therefore the toilet itself cannot malfunction. Since ash and dissolved minerals and salts are constantly being removed automatically, this toilet produces no sludge which has to be pumped out. Therefore, it is essential that the path and turbulance of the venting air be carefully controlled.

Figure 7:
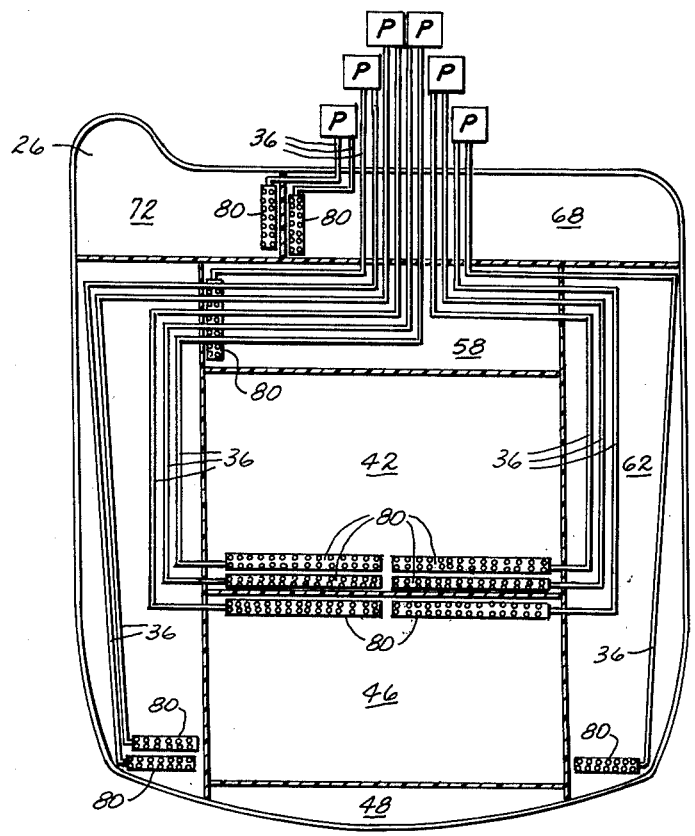
FIG. 7 is a simplified schematic view similar to FIG. 5 revealing placement of aeration devices.

FIG. 7 schematically discloses the six double outlet aquarium aerator pumps indicated by the letter P, and the approximate routing of the air supply tubing 36 to the exact locations of the diffusers 80. This is the equivalent of 12 pumps. More or fewer pumps might be used, depending on their output. The object is to use a pump for each chamber, in order to meter the exact amount of aeration air desired for each chamber. This permits complete control of aeration. In this instance, chamber 42 receives four times the volume of air that chambers 58, 62, 68 and 72 receive, and twice as much as chambers 46 and 50, because ths strongest culture and the most food for the culture is in chamber 42. Additionally, the large volume of air in chamber 42 causes a superior turbulance, which has a tendancy to pull suspended solids which have gone over weir 44 back from chamber 46 into chamber 42 again.

Figure 13:
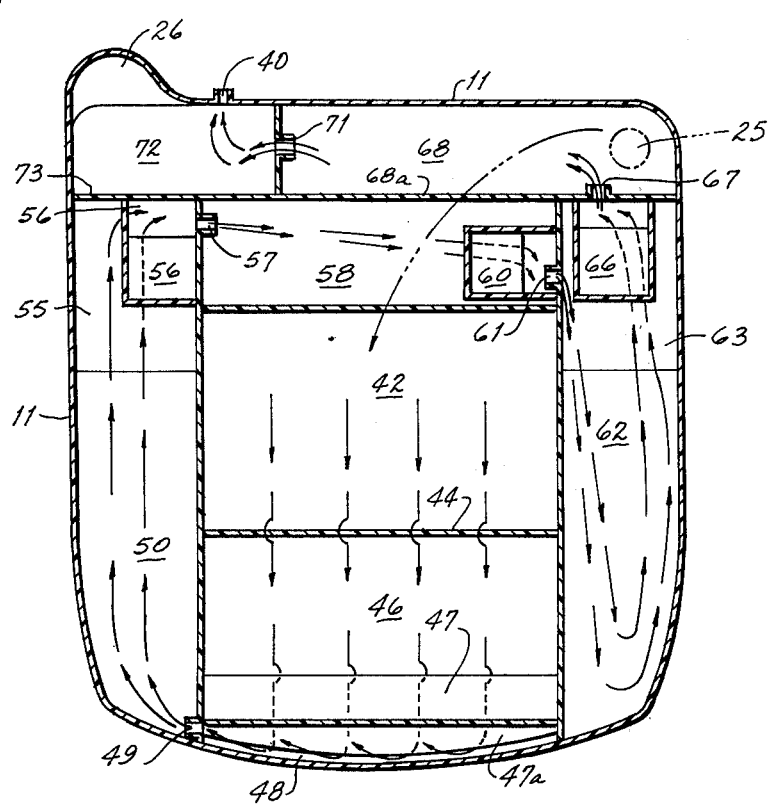
FIG. 13 is a simplified schematic view similar to FIG. 7, revealing liquid flow.

FIG. 13 schematically discloses the optimal liquid flow through the various compartments 42, 46, 48, 50, 56, 58, 60, 62, 66, 68 and 72 via overflow apertures 49, 57, 61, 67, 71 and 40, after crossing weir 44 respectively. No leakage is permitted, therefore positive control of liquid flow is achieved. Aerobic digestion is almost complete before the liquid overflows into compartment 58, but time is required to starve the coliform bacteria that escape the digestive culture. It takes 21 days to starve the coliform after it is removed from its food source. The main purposes of compartments 58, 62 and 68 are to remove the balance of the B.O.D. (biological oxygen demand), oxydize out the refractory or volatile end products and to remove the balance of the bacteria. Compartment 72 is outside of the flushing cycle, therefore, under normal conditions it can never be contaminated by raw sewage. This compartment is for polishing the effluent, because, if there is liquid in this compartment, there will probably be an overflow through tube 40. Normally, this overflow will have zero coliform — and this is accomplished entirely without disinfection — and from five to 10 PPM of B.O.D. and suspended solids — an excellent effluent, especially when it will be only a trickle at most. Assuming that an average family of four uses the toilet properly, the total treatment time is about 50 days, which is more than ample for excellent treatment and bacteria die-out. Also shown in phantom lines, the manual flushing pump 25 and a phantom arrow indicating water which is introduced via rinsing orifices 17 (See FIG. 4) into the bowl 16 and thence into the primary compartment 42.

Figure 14:
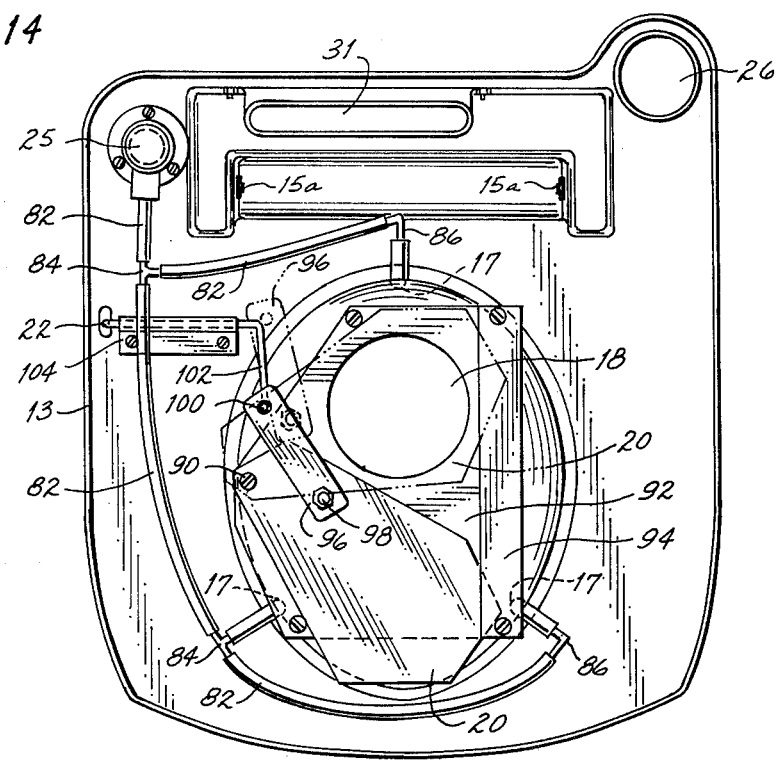
FIG. 14 is an underside plan view of the upper functioning portion of the toilet.
Figure 15:
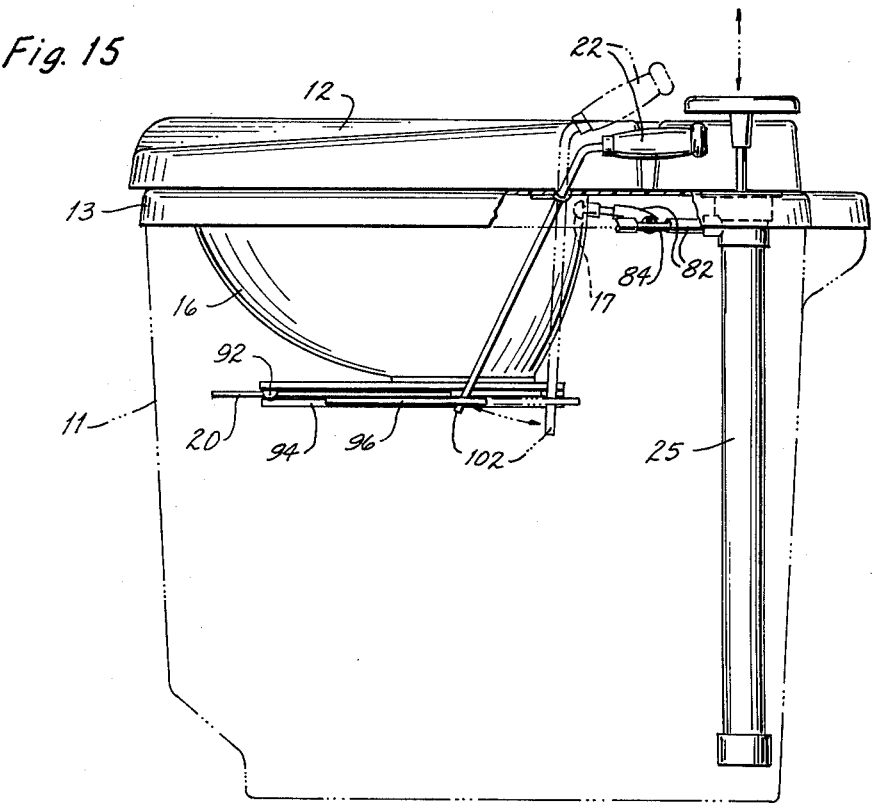
FIG. 15 is a left side elevational view of the upper functioning portion of the toilet.

FIG. 14 discloses the configuration and functions of the mechanical aspects of the upper portions of the toilet, and is drawn in an inverted position. FIG. 15 is a left-side elevational view of this same portion of the toilet and reference to both Figures discloses the exhaust vent opening 26, the intake opening 31, the recessed and enclosed hinged toilet seat 14 and toilet lid 12, toilet lid hinge pivotal support 15, and hinge pins 15a. Projecting downward from and attached to the upper portion is a conventional commercially available manual pump 25 which draws liquid from the flushing compartment 68 and pumps the flushing water through flexible plastic tubing 82 and plastic tee joints 84, and plastic elbow joints 86 to rinsing orifices 17, which are mounted through the wall of bowl 16 to the inside of bowl 16. At this point, it is important to note that the location of the bowl aperture 18 is scientifically positioned to receive fecal matter from humans with virtually no contact with the inside of the bowl, since the aperture door is opened prior to use. However, loose stool and/or urine may indeed be communicated to the bowl, hence the desirability of the rinsing-flushing action of the dispensing orifices 17, which are so oriented as to produce a swirling and scouring action within the bowl 16.

Mounted directly under the bowl aperture 18 to an integral flange is a horizontally disposed guillotine-type aperture door 20 which is pivotally mounted at one corner by a screw 90 and the opposite corner is slideably sandwiched between base plate 92 and the parallel mounted support 94. A connecting link 96 is pivotally attached at one end of the door 20 by a bolt 98 and has an oversized hole 100 to insertably receive the terminus 102 of the zee-shaped door lever 22 which is pivotally mounted to the underside of the upper toilet portion 13 by a bracket 104. In FIG. 14, the solid lines of the door 20, link 96 and lever terminus 102 show the door 20 in the opened position. The phantom lines depicting the same components depict the closed position. Likewise in FIG. 15, the solid lines of the lever depict the open position and phantom lines depict the closed position. Phantom arrows in FIG. 15 depict the obvious lines of motion described by the lever and the pump-handle.

Figure 16:
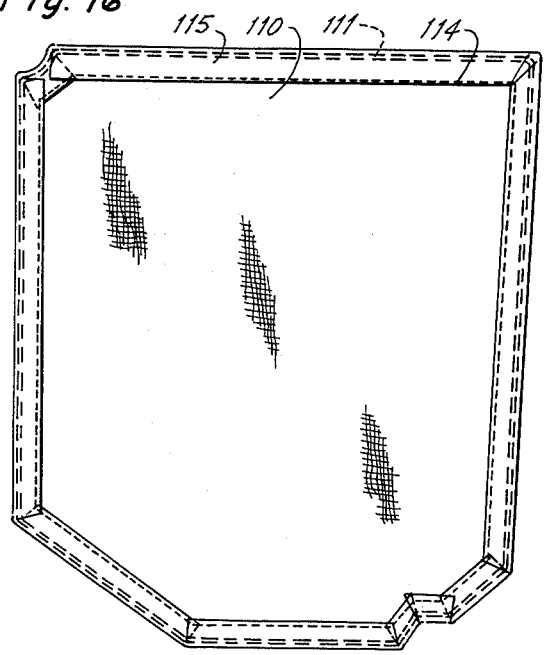
FIG. 16 is an elevational view of a wick.
Figure 17:
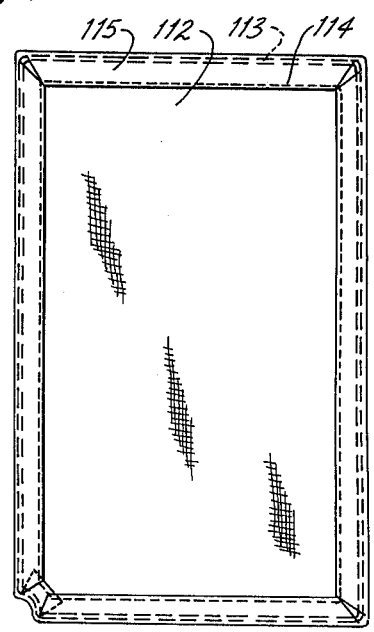
FIG. 17 is an elevational view of another wick.

FIG. 16 depicts a cloth wick 110 which conforms to the configuration of compartments 50 and 62, while FIG. 17 depicts a cloth wick 112 which conforms to compartment 58. In both instances, the wicks are held stretched to their shapes by formed wire skeletons 111 and 113, respectively, while stitching 114 secures the flaps 115 of the cloth around the wire skeletons 111 and 113. One or more of these wicks may be inserted into the various compartments, including appropriately shaped wicks for compartments 68 and 72, if desired. One wick might increase the evaporative area in a compartment 10 fold. However, in practical application, they would only be desireable in compartments 50, 58 and 62, and then only in case of excessive use, such as in construction job sites or public function portable toilets.

Details of the pump pack have been omitted since they do not in themselves construe an inventive concept. They are merely ganged and plugged into a fused common receptical within the pump pack enclosure for easy replacement and/or servicing. The single pair of wires and plug are then plugged into a convenient outlet. Since no electrical wiring or components come in contact with anything metallic or the plastic pipe, grounding plugs are not deemed necessary. This toilet is perfectly safe.

The diffusers 80 snap into clamps (not shown) so that the diffusers may be removed for cleaning, if necessary, without getting the hands in the liquid.

Although specific embodiments of the invention have been described herein, it is not intended to limit the invention solely thereto, but to include all of the obvious variations and modifications within the spirit and scope of the appended claims.

What is claimed is:

1. An aerobic digestion toilet structure for purifying organic waste material dissolved or dispersed in water comprising: a toilet bowl; a main liquid-filled digestion chamber having vertical side walls said main digestion chamber being divided into first and second side-by-side portions by a vertical weir having an upper edge slightly below the liquid level in said chamber portions inlet means communicating with said first chamber portion for receiving organic waste from the bowl; a plurality of secondary liquid-filled digestion chambers surrounding the vertical side walls of said main chamber and forming therewith a unitary portable structure; means connecting said chambers in series such that a volume of waste added to said main chamber displaces liquid sequentially into the last downstream secondary chamber, said connecting means including between each two serially-connected chambers a quiescent chamber in which solids settle by gravity and means forming an overflow outlet from the respective quiescent chamber to the next downstream digestion chamber, the quiescent chamber associated with said main digestion chamber being in communication with said second chamber portion at a location remote from said weir; means for continuously mixing the contents of each digestion chamber to maintain any solids therein in suspension and for continuously aerating the contents of each chamber, said mixing and aerating means including air inlet means located adjacent the lower end of said weir and wherein said first and second chamber portions have bottom walls inclined downwardly toward the lower end of said weir to cause circulation of the liquid in each of said chamber portions in a direction upward along said weir, then away from said weir, then downwardly along respective chamber side walls and then toward said weir; and a pump carried by said unitary structure for pumping rinse liquid from one of the secondary chambers to said bowl.

2. A toilet structure as in claim 1 including wick means dipping into the liquid in at least one of the secondary chambers to accelerate evaporation of liquid and means for inducing a draft of atmospheric air across the wick means.

3. A toilet structure as in claim 1 wherein said bowl is provided with an orifice leading to said main chamber, said structure further including a manually operated door structure adapted to open and close said orifice, said door structure comprising a base plate attached to said bowl and having an orifice aligned with said bowl orifice, a support plate parallel with and spaced from said base plate having an orifice aligned with said bowl orifice, a door pivoted to said plates in position to open and close said orifice, a link connected to said door, a pivoted lever connected to said link and adapted to manually operated to open and close said door.

* * * * *